(12) United States Patent
Chen et al.

(10) Patent No.: US 7,076,515 B2
(45) Date of Patent: Jul. 11, 2006

(54) FLIPPING ALGORITHM TO ARCHITECTURES OF HARDWARE REALIZATION FOR LIFTING-BASED DWT

(75) Inventors: Liang-Gee Chen, Shindian (TW); Chao-Tsung Huang, Taipei (TW); Po-Chih Tseng, Taoyuan Hsien (TW)

(73) Assignee: National Taiwan University, Taipei (TW)

( * ) Notice: Subject to any disclaimer, the term of this patent is extended or adjusted under 35 U.S.C. 154(b) by 620 days.

(21) Appl. No.: 10/219,309

(22) Filed: Aug. 16, 2002

(65) Prior Publication Data

US 2004/0034675 A1    Feb. 19, 2004

(51) Int. Cl.
  *G06F 17/14* (2006.01)
(52) U.S. Cl. .................................. 708/400
(58) Field of Classification Search .......... 708/300, 708/308, 400, 401
  See application file for complete search history.

(56) References Cited

U.S. PATENT DOCUMENTS

| | | | |
|---|---|---|---|
| 6,567,081 B1 * | 5/2003 | Li et al. | 345/419 |
| 6,757,343 B1 * | 6/2004 | Ortega et al. | 375/340 |
| 6,795,504 B1 * | 9/2004 | Xu et al. | 375/240.19 |
| 6,904,177 B1 * | 6/2005 | Nakayama | 382/240 |

* cited by examiner

*Primary Examiner*—Chuong D. Ngo
(74) *Attorney, Agent, or Firm*—Rosenberg, Klein & Lee

(57) ABSTRACT

A flipping algorithm for the hardware realization of Lifting-based DWT, relates a flipping algorithm and hardware architecture for the hardware realization of Lifting-based DWT, by using lifting architecture as starting point, by multiplying the edge of the cutset which is through the multiplier and the basic computing unit by the reciprocal of multiplier coefficient in order to cut off the accumulation effect of timing delay. And separating the computing node of said basic computing units into 2 adders then applying flipping architecture to shorten the critical path, therefore not only can keep the merits of Lifting Scheme in hardware requirement but also can shorten the critical path to achieve the optimized hardware architecture.

7 Claims, 9 Drawing Sheets c = 4/5 = 0.110011001100₂

FLIPPING ALGORITHM TO ARCHITECTURES OF HARDWARE REALIZATION FOR LIFTING-BASED DWT

BACKGROUND OF THE INVENTION

1. Field of Invention

The present invention relates generally to a Discrete Wavelet Transform (DWT) technique used in image compression standard, and more particularly, to a flipping algorithm for hardware realization of Lifting-based DWT.

2. Description of the Prior Art

Due to DWT has very good time-frequency decomposition results, many researches on signal analysis and compression based on the DWT have gained abundant results, more particularly, emerging image compression standards, such as JPEG2000 still image coding and MPEG-4 still texture coding, have adopted DWT as core algorithm. Comparing to some older generation of transform methods, such as Discrete Cosine Transform (DCT), which get involved in more volume arithmetic operations. Besides, comparing to the way of DCT to handle image blocks, basically DWT processes the whole image together so as to need more memory space and broader bandwidth which are the bottleneck of hardware realization of two-dimensional DWT (2-D DWT).

Due to DWT gets involved in only one pair wavelet filter operation in itself, so it will be much direct way to handle the operation by using Convolution. It can be expressed in term of mathematics as followed:

$$x_L(n) = \sum_{i=0}^{K-1} h(i) \cdot x(2n-i) \quad (1)$$

$$x_H(n) = \sum_{i=0}^{K-1} g(i) \cdot x(2n-i)$$

In which $X_l(n)$ and $X_h(n)$ are defined as the low- and high-pass signals respectively, and h(n) and g(n) as the coefficients of low-pass and high-pass filters respectively. Referring to FIG. 1, it shows a Convolution-based DWT hardware architecture which has two input and two output signals points per clock cycle with the least latency and minimum number of registers are required; Wherein $T_m$ is defined as timing delay of multiplier, $T_a$ as timing delay of an adder and $C_m$ as a hardware cost of a multiplier, $C_a$ as a hardware cost of an adder and K as length of filter. The critical path $T_m+(K-1)T_a$ and the required hardware size $2KC_m+2(K-1)C_a$ can be found in FIG. 1, by using adder tree that the critical path can be further lower to $T_m+\lceil \log_2 K \rceil \cdot T_a$. But due to Convolution gets involved in more volume of calculation and the more complexity of control circuit in the Boundary Extension, thus Lifting Scheme is employed to aim to decrease the amount of DWT calculation and the complexity of control circuit in Boundary Extension and memory accessing. And, further a method to achieve Lifting Scheme by using the factorization of Poly-Phase Matrix, then the Lifting Scheme is more widely employed in the hardware and software realization of DWT. In Lifting Scheme any perfect reconstruction DWT filter pair can be factorized into a series of lifting steps. DWT Poly-Phase Matrix can be factorized into a series of upper triangles and lower triangles and one constant diagonal matrix, and it can be expressed in term of mathematics as followed:

$$h(z) = h_e(z^2) + z^{-1}h_0(z^2) \quad (2)$$

$$g(z) = g_e(z^2) + z^{-1}g_0(z^2)$$

$$P(z) = \begin{bmatrix} h_e(z) & g_e(z) \\ h_0(z) & g_0(z) \end{bmatrix} = \prod_{i=1}^{m} \begin{bmatrix} 1 & s_i(z) \\ 0 & 1 \end{bmatrix} \begin{bmatrix} 1 & 0 \\ t_i(z) & 1 \end{bmatrix} \begin{bmatrix} K & o \\ 0 & 1/K \end{bmatrix}$$

Wherein h(z) and g(z) are defined as low pass and high pass filter, and P(z) is defined as corresponding Poly-Phase Matrix. By using JPEG2000 (9,7) filter set as example, (9,7) filter set can be disassembled into four lifting steps and one normalization step, which is illustrated in term of mathematics as followed:

$$P(z) = \begin{bmatrix} 1 & a(1+z^{-1}) \\ 0 & 1 \end{bmatrix} \begin{bmatrix} 1 & 0 \\ b(1+z) & 1 \end{bmatrix} \begin{bmatrix} 1 & c(1+z^{-1}) \\ 0 & 1 \end{bmatrix} \quad (3)$$

$$\begin{bmatrix} 1 & 0 \\ d(1+z) & 1 \end{bmatrix} \begin{bmatrix} K & 0 \\ 0 & \frac{1}{K} \end{bmatrix}$$

This can be expressed as a signal flow chart shown in FIG. 2, wherein black point is defined as computation node, grey point as register node, white point as input node, the computation node can be used to sum up all inputs. Due to K and 1/K can be realized independently outside Lifting Step or the stage following DWT is data compression, then normalization step can be proceeded with quantization procedure, so only the realization of lifting step is discussed here.

To realize convolution-based DWT(9,7) filter, plus using adder tree and due to the property of coefficient symmetry, there will be required 4 multipliers, 14 adders and 7 registers. But shown in FIG. 2, to realize Lifting-based DWT(9,7) filter, only 4 multipliers, 8 adders and 4 registers are needed (realization of K and 1/K are excluded here). Nevertheless, convolution based critical path is $T_m+4T_a$ only, while the critical path shown in FIG. 2 is $4T_m+8T_a$. By pipelining Lifting-based architectures can shorten the critical path effectively, but the number of registers is increased. For example, if cutting FIG. 2 into 4 pipelining stage, the critical path is decreased to $T_m+2T_a$, but 6 more registers are needed; It is a very serious problem to realize Line-Based two-dimensional DWT because the number of registers in the one-dimensional DWT architecture is positively proportional to the size of internal memory in the two-dimensional lined-based DWT hardware architecture.

In order to minimize the memory size of 2D-DWT realization, Line-Based method can be employed to decrease the demand for memory size by using adequate memory access management to reduce the whole image occupied memory size to only a couple line buffers of image width. Besides, Line-Based method can also be applied to decrease the accessing numbers to the external frame memory.

By increasing the internal line buffer in which the number of registers is positively proportional to the registers in the adopted one-dimensional DWT hardware. Referring to FIG. 4, which is the schematic diagram for the internal line buffer transformed from registers. FIG. 4(a) is the circuit diagram in the one-dimensional DWT hardware. FIG. 4(b) is the circuit diagram transformed into line-based two-dimensional DWT architecture, wherein R is defined as register;

$K_0$ as the number of one-dimensional DWT hardware; N as the width of image. Thus, the memory size indeed is positively proportional to the number of registers in one-dimensional architecture. Therefore, to minimize the memory size is the first priority consideration to realize the hardware of two-dimensional DWT under fixed hardware speed restrictions. But, the trade-off between critical path and line-based memory in the hardware realization of DWT never be revealed and discussed in any papers.

According to the previous stated, by using Lifting Scheme to realize hardware DWT has more merits than by using Convolution, and it needs less line buffer but longer critical path than that by using convolution. Although we can decrease the critical path by applying pipelining method but still more memory size will be needed. In this circumstance, by using Lifting Scheme to realize DWT hardware still faces a certain extent difficulty. Thus, in the light of the forgoing consideration, the present invention proposed a new Flipping algorithm aimed to solve the problem by using Lifting Scheme as starting point and flipping some Lifting steps to decrease the critical path while still retaining all the merits of Lifting Scheme. The Flipping algorithm of the present invention for sure has the best solution and efficiency in all aspects than that of Convolution.

SUMMARY OF THE INVENTION

It is an object of this invention is to provide a Flipping Algorithm and its hardware architecture aimed to be used in the realization of Lifting-based DWT architectures. It is featured in having some merits that the amount of calculations of DWT and the controlling complexity of memory accessing as well as boundary extension can be decreased, meanwhile the critical path can be shortened.

Yet another object of the invention is to provide a Flipping Algorithm and its hardware architecture aimed to be used in the realization of DWT hardware featured in having the least memory size and minimum hardware requirement as well as the better critical path under a certain fixed hardware specifications and restrictions circumstances.

A further object of the invention is to provide a Flipping Algorithm and its hardware architecture featured in having better performance among critical path and hardware requirement as well as the number of registers used.

In order to achieve the above stated goal, the present invention uses Lifting Scheme as backbone and then proceeds the Flipping steps by eliminating multiplier used to connect basic computing unit to cut off accumulate effect of timing delay. By multiplying the reciprocal of the multiplier coefficient by the edge of feed-forward cutset which is along through the corresponding multiplier can be used to eliminate the multiplier. And finally, by separating computation node in the basic computing units into 2 adders, wherein one adder functions with the other basic computing units and the other adders are routed on the accumulation of time delay.

The present invention will become more fully understood from the detailed description of preferred embodiment of the invention given herein below in conjunction with the drawing.

DETAIL DESCRIPTION OF THE PREFERRED EMBODIMENTS

Due to known Lifting-based hardware architecture need less amounts of calculation and hardware source, but suffering longer critical paths than that of Convolution. And if trying to shorten the critical path by using pipelining method will lead to increase the number of registers. Thus, the present invention of Flipped Algorithm and its hardware architecture can be applied to shorten the critical path of Lifting-based architecture.

Figure 5A:
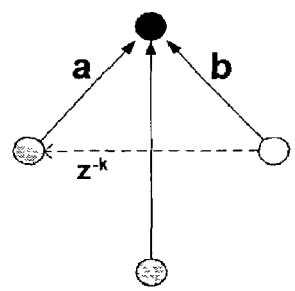
FIG. 5(a) is the schematic diagram for the basic computing unit of the lifting-based architectures.

From the formula (2) as previously stated, due to Lifting Scheme that is composed of a series of Lifting Steps so that its critical path is the sum of every Lifting Step and this is the reason why Lifting Scheme faces difficulty. Some known lifting-based methods, (such as C. -T. Huang, P. -C. Tseng, and L. -G. Chen, published on year 2002 "Efficient VLSI architectures of lifting-based discrete wavelet transform by systematic design method" in IEEE International Symposium on Circuits and Systems), for any given wavelet filter set, can easily be applied to get an efficient Lifting-based architecture which is composed of interconnecting basic computing units shown in FIG. 5(a) and its critical path is the sum of timing delay of basic computing units if without pipelining. The reason causing the accumulation of timing delay is that in every basic computing unit the output of computation node connects to the input point of next basic computing unit that causes the accumulation of time delay.

Figure 5B:
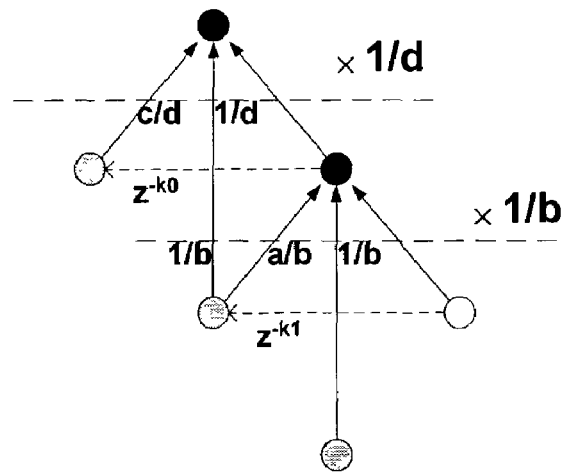
FIG. 5(b) is the schematic diagram for 2 flipped basic computing units.
Figure 5C:
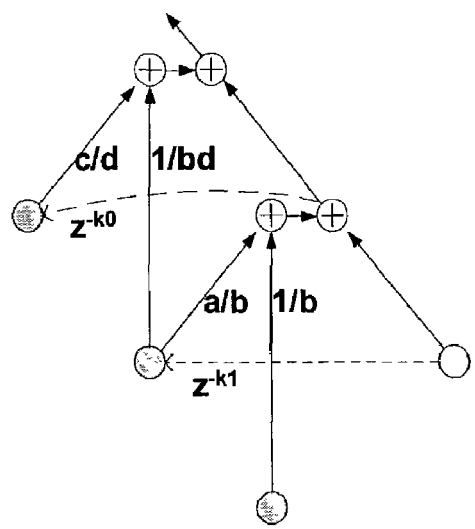
FIG. 5(c) is the schematic diagram for the adders and multipliers are relocated after separating computation node into 2 adders.

In order to eliminate this accumulation, the present invention is applied to eliminate the multipliers, which are on the accumulation path, between input point to the computation node in the basic computing units. To eliminate the multiplier by flipping the corresponding reciprocal of multiplication coefficient is shown in FIG. 5(b). It multiplies the Edge of the feed-forward Cutset, which is along through the corresponding multiplier, by reciprocal of multiplication coefficient. And then in the basic computing units, the computation node can be separated into 2 adders wherein 1 adder can function with the other corresponding adders in the other basic computing units, and the other adder is routed on the accumulation of timing delay. Therefore, the serious accumulation of the timing delay can be lowered by using Flipping method of the present invention.

The other aspect of the present invention is that if all basic computing units are flipped, no more multipliers is needed to be added. Besides, all flipped coefficients of multipliers should be accounted in Normalization Step to make sure for both coefficients of low- and high-pass are correct. Using (9,7) filter as an example, if all the basic computing units are flipped then it can be expressed in term of poly-phase matrix as followed:

$$P(z) = \begin{bmatrix} 1 & a(1+z^{-1}) \\ 0 & 1 \end{bmatrix} \begin{bmatrix} 1 & 0 \\ b(1+z) & 1 \end{bmatrix} \begin{bmatrix} 1 & c(1+z^{-1}) \\ 0 & 1 \end{bmatrix} \quad (4)$$

$$\begin{bmatrix} 1 & 0 \\ d(1+z) & 1 \end{bmatrix} \begin{bmatrix} K & 0 \\ 0 & 1/K \end{bmatrix}$$

$$= \begin{bmatrix} 1/a & 1+z^{-1} \\ 0 & 1/a \end{bmatrix} \begin{bmatrix} 1/b & 0 \\ 1+z & 1/b \end{bmatrix} \begin{bmatrix} 1/c & 1+z^{-1} \\ 0 & 1/c \end{bmatrix}$$

$$\begin{bmatrix} 1/d & 0 \\ 1+z & 1/d \end{bmatrix} \begin{bmatrix} abcdK & 0 \\ 0 & abcd/K \end{bmatrix}$$

Figure 6:
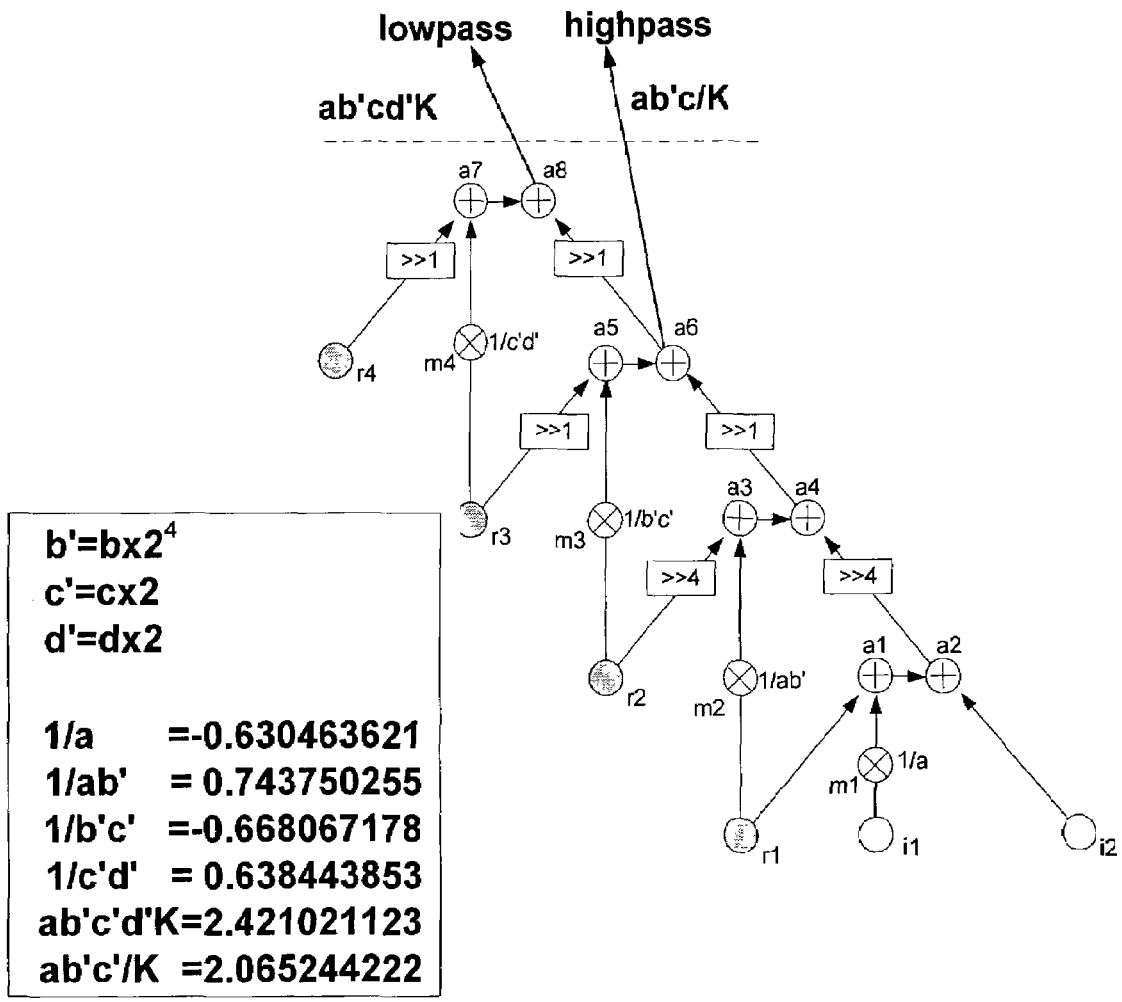
FIG. 6 is the detailed flipping diagram of the present invention applied for (9,7) filter.

A preferred embodiment of the present invention is now explained with reference to the accompanying drawings. Referring to FIG. 6 which is the detailed flipping schematic diagram of (9,7) filter wherein the above of the dotted line is Normalization portion which is excluded to be discussed in the present invention. This flipping architecture is made of 4 registers, 8 adders and 4 multipliers and there are 2 input signals and 2 output signals in one clock cycle (wherein shifters and the coefficients of multipliers are related, therefore they are not discussed here).

According to the drawing, 2 input signals are numbered as i1 and i2; Registers are numbered from r1 to r4; Adders are numbered from a1 to a8; Multipliers are numbered from m1 to m4; All multipliers are all flipped which means every multiplier respectively multiplies the reciprocal of coefficient of multipliers (1/a, 1/b', 1/c' and 1/d'). The detailed description is stated as followed. The inputs of the registers r1, r2, r3 and r4 are the outputs of i2, a2, a4 and a6 respectively. The inputs of multipliers m1, m2, m3 and m4 are the output of i1, r1, r2 and r3 respectively. The input of adder a1 is the outputs of m1 and r1. The input of adder a2 is the outputs of a1 and i2. The input of adder a3 is the outputs of m2 and r2. The input of adder a4 is the outputs of a3 and a2. The input of adder a5 is the outputs of m3 and r3. The input of adder a6 is the outputs of a5 and a4. The input of adder a7 is the outputs of r4 and m4. The input of adder a8 is the output of a7 and a6. Finally, the outputs of a6 and a8 are the high- and low-pass signals respectively which are the outputs of this architecture. Thus, the flipping flow chart is much understood in the accompanying with above description.

In fact, the flipping structure has possibly different variations. The number of flipping stages and which basic computing units should be flipped depend on the choice of the filter set and limitation of hardware. The flipping structure not only can shorten the critical paths but also can optimize the hardware design of DWT. The present invention can also be applied to INVERSE DWT because the basic computing units and lifting-based architectures generated after lifting factorization are the same as DWT.

A preferred embodiment of the present invention is now explained in more details as followed and made to compare with some known technologies which are stated and charted as below.

Figure 1:
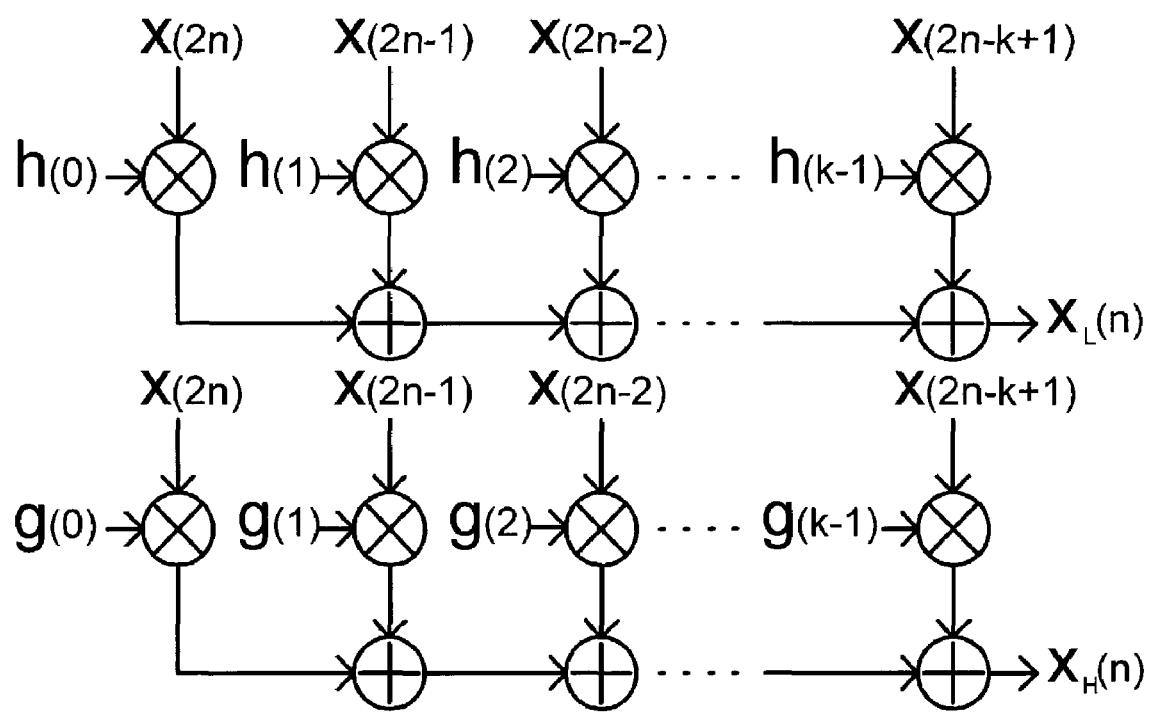
FIG. 1 is the scheme diagram for Convolution based DWT hardware architecture.
Figure 2:
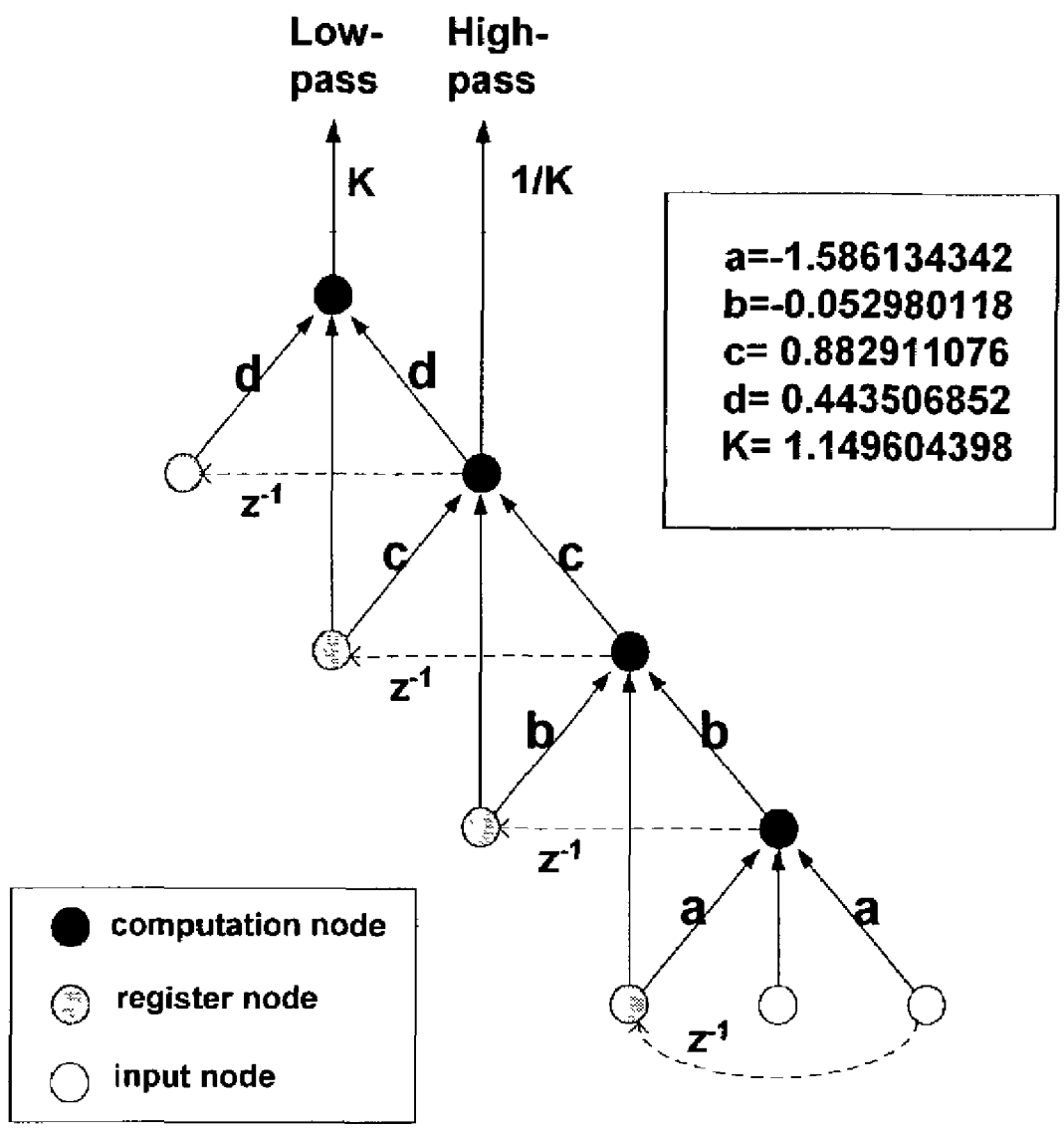
FIG. 2 is a known signal flow chart for the Lifting-based architecture of (9,7) filter set.
Figure 3:
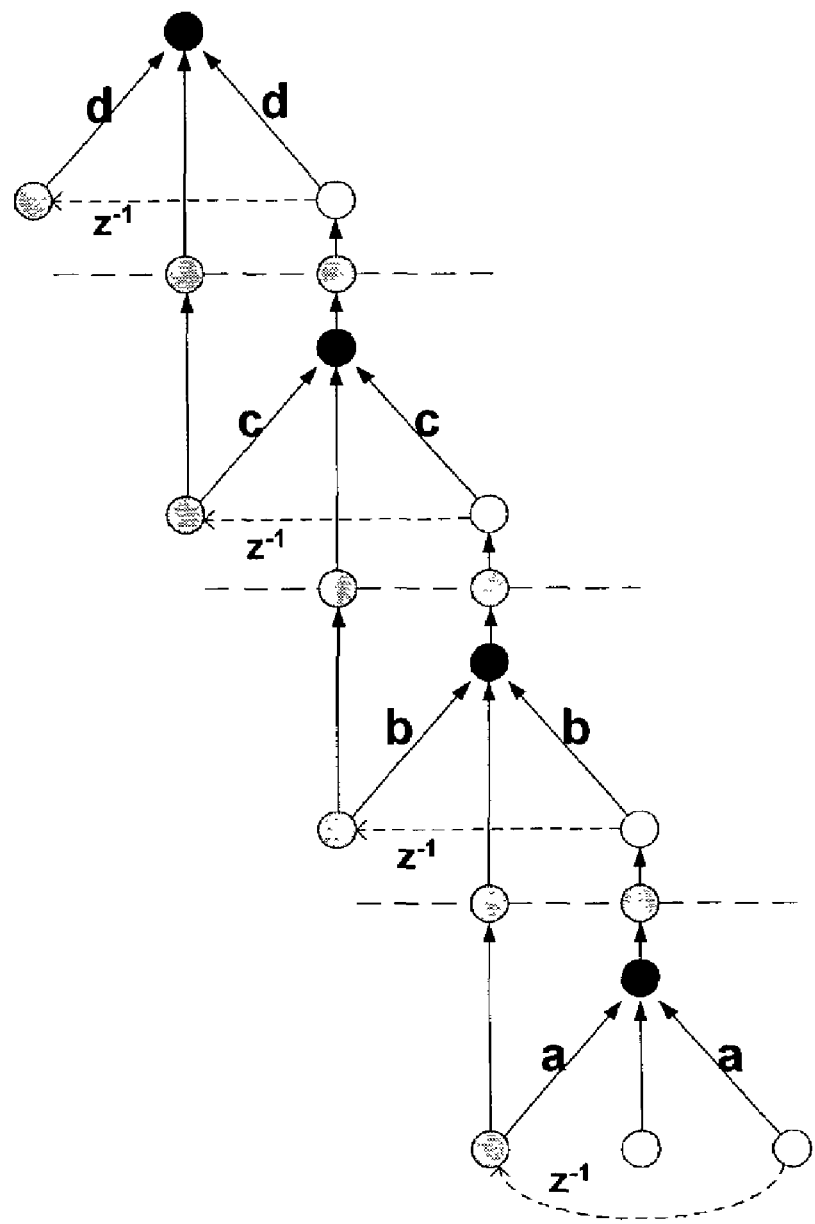
FIG. 3 is a diagram for cutting FIG. 2 into 4 pipelining stages.
Figure 4A:
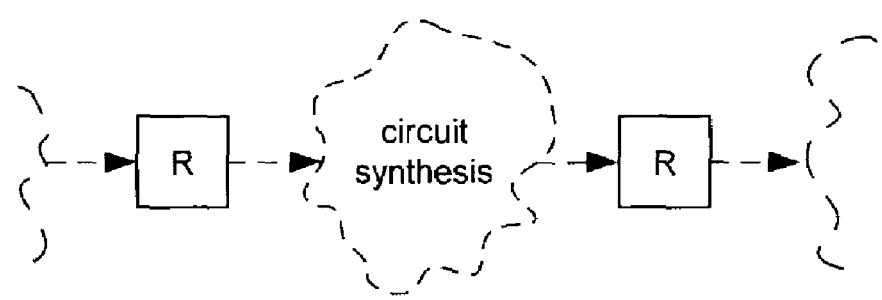
FIG. 4(a) is a circuit diagram for one-dimensional DWT hardware architecture.
Figure 4B:
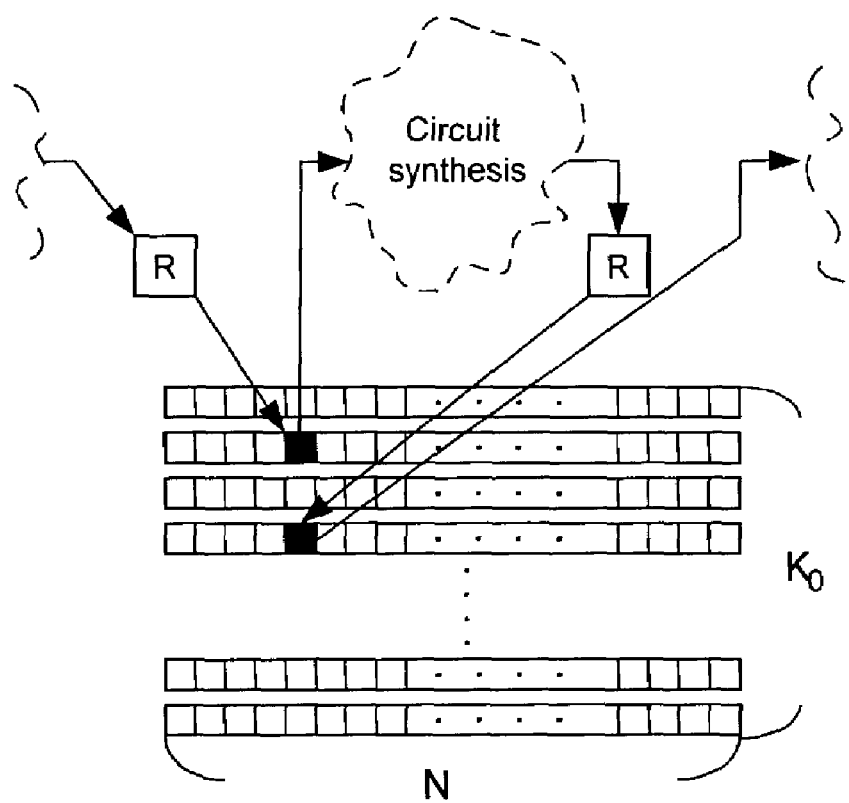
FIG. 4(b) is the corresponding lined-based two-dimensional hardware architecture circuit diagram transformed by FIG. 4(a)

Because the lifting structure of JPEG2000 defaulted (9,7) filter is very regular and typical and with the property of its good efficiency in image compression and analysis, so that it is the reason to choose (9,7) filter as an example of the hardware realization of DWT. And then we will make some comparisons among hardware requirements, critical paths and registers used between the known Lifting-based architectures, Flipping structures, and Convolution-based architectures as followed. As previously stated, Convolution-based architecture needs 9 multiplier, 14 adders and 7 registers and critical path is Tm+4Ta, then after 3-stage pipelining, the critical path is lowered to Tm but the number of registers increases to 23. In the Lifting-based architecture referring to FIG. 2, it needs 4 multipliers, 8 adders and 4 registers but the critical path is 4Tm+8Ta. After 4-stage pipelining, the critical path referring to FIG. 3 is lowered to Tm+2Ta, but the number of registers increases to 10. If the critical path is decreased to Tm then 32 registers are needed.

Figure 7A:
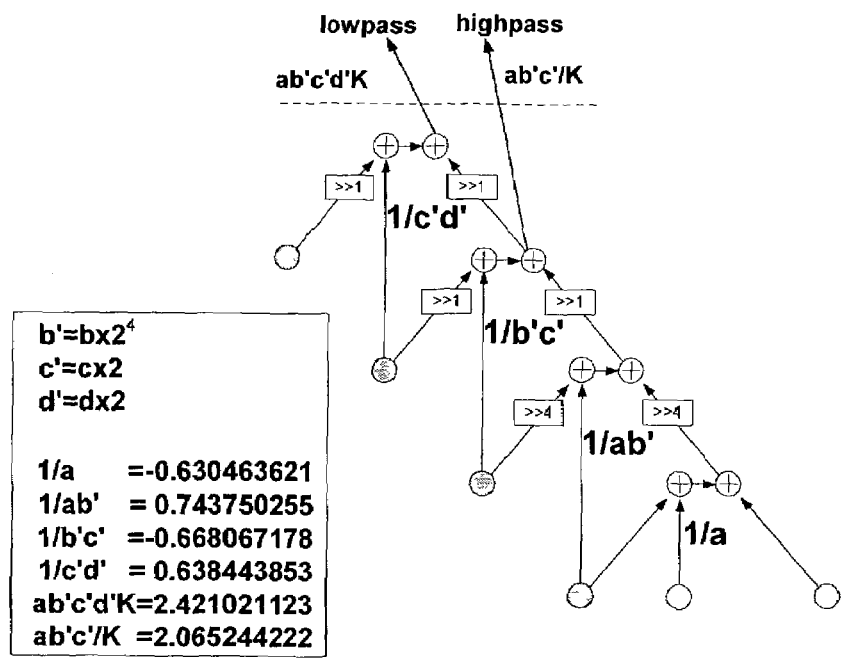
FIG. 7(a) is the schematic diagram for (9,7) filter hardware architecture.
Figure 7B:
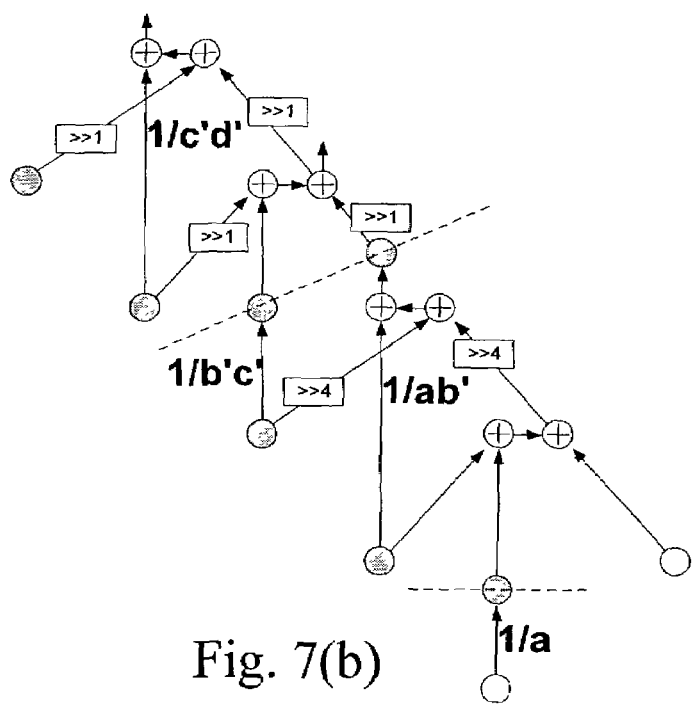
FIG. 7(b) is the schematic diagram for 3 pipelining stage (9,7) filter hardware architecture.
Figure 7C:
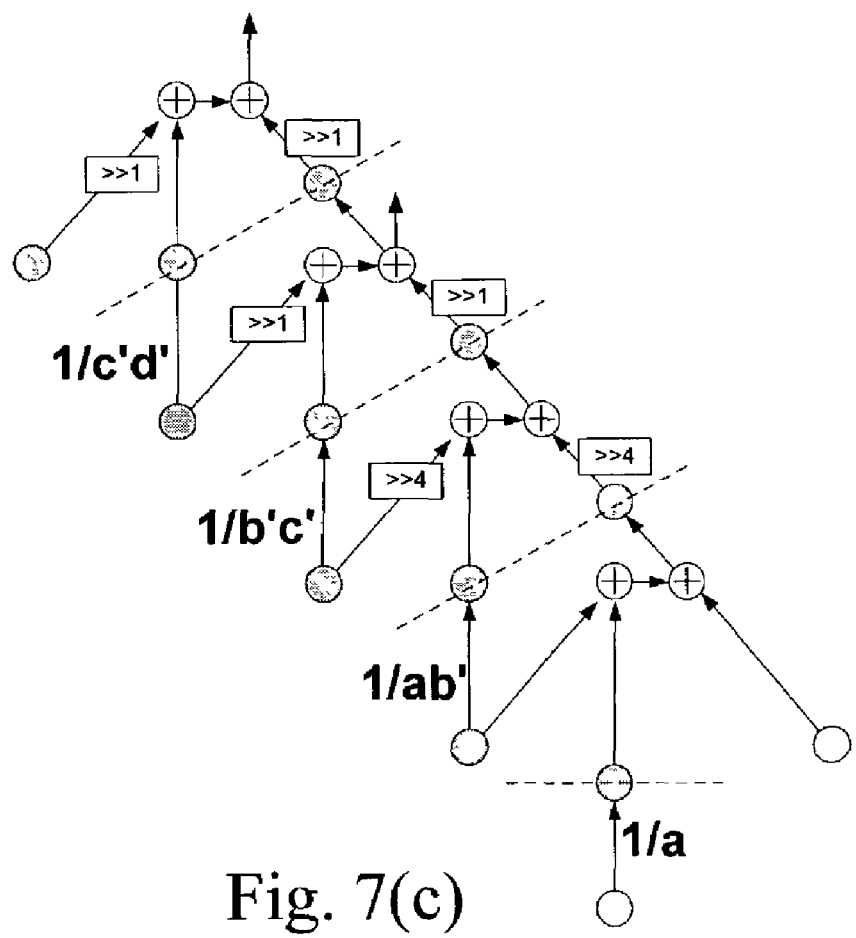
FIG. 7(c) is the schematic diagram for 5 pipelining stage (9,7) filter hardware architecture.

While flipping the Lifting-based architectures, due to the appearance of the reciprocals of multiplier coefficients, the precision issue must be carefully taken care of. By applying the present invention to flip (9,7) filter referred to FIG. 7, all basic computing units have been flipped, and the precision has been taken care of in this case. The number of needed multipliers, adders and registers are the same as shown in FIG. 2, but the critical path is lowered to Tm+5Ta. Having FIG. 7(a) 3-stage pipelined and relocating some multipliers and adders then the critical path is lowered to Tm+Ta and only 3 more registers are needed shown in FIG. 7(b). Finally shown in FIG. 7(c), having it 5-stage pipelined then the critical path is minimized to lower to Tm and only 11 registers are needed.

In order to make the comparison results closer to the reality, these different architectures have been verified by first writing the Verilog codes, and then synthesizing the circuits by using Avant! 0.35 um cell library and Synopsys Design Compiler. For the circuit synthesis, the time constrains are set as tight as possible in order to make the comparison more easily. The verification result is close to the previously estimated. The chart below shows the all comparisons and verification results wherein we use the size of line buffers, instead of the number of registers, and L is defined as the width of images.

TABLE 1

| | Multi-plier | adder | critical path | register | time (ns) | Number of Logic gates |
|---|---|---|---|---|---|---|
| Lifting architecture (no pipelined) | 4 | 8 | $4T_m + 8T_a$ | 4 L | 55 | 12448 |
| Lifting architecture (4-stage pipelined) | 4 | 8 | $T_m + 2T_a$ | 10 L | 16 | 12886 |
| Lifting architecture (all-stage pipelined) | 4 | 8 | $T_m$ | 32 L | — | — |
| Flipping architecture (no pipelined) | 4 | 8 | $T_m + 5T_a$ | 4 L | 21 | 10102 |

TABLE 1-continued

| | Multiplier | adder | critical path | register | time (ns) | Number of Logic gates |
|---|---|---|---|---|---|---|
| Flipping architecture (3-stage pipelined) | 4 | 8 | $T_m + 1T_a$ | 7 L | 12.3 | 9703 |
| Flipping architecture (5-stage pipelined) | 4 | 8 | $T_m$ | 11 L | 10.1 | 10752 |
| Convolution architecture (no pipelined) | 9 | 14 | $T_m + 4T_a$ | 7 L | — | — |
| Convolution architecture (3-stage pipelined) | 9 | 14 | $T_m$ | 23 L | — | — |

According to Table 1, it shows the present invention has better performance in the aspects, including critical path, hardware cost and the number of registers used, under the same hardware specification and application restrictions.

Besides, The Lifting Scheme not only has some merits in realizing hardware and software but also provides a good backbone to design wavelet-like filter sets. David B. H. Tay, "A class of lifting based integer wavelet transform," in Proc. of International Conference on Image Processing, 2001, vol. 1, pp. 602–605. and Z. Guangjun, C. Lizhi, and C. Huowang, "A simple 9/7-tap wavelet filter based on lifting scheme," in Proc. Of International Conference on Image Processing, 2001, vol. 2, pp. 249–252, both proposed a set of integer wavelet filters based on the Lifting-based architecture of the (9,7) filter. And both of them can give an identical integer wavelet filter based on the (9,7) filter, which is pretty close to the original (9,7) filter.

Figure 8:
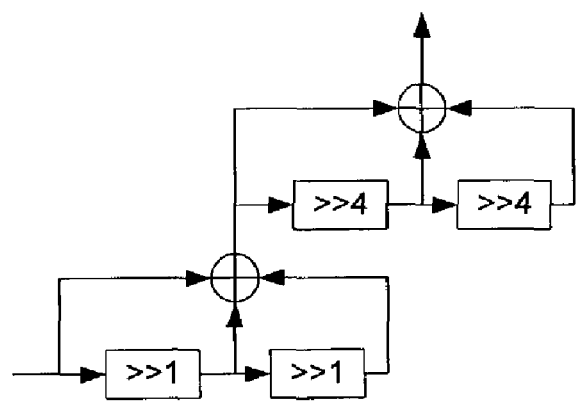
FIG. 8 is the schematic diagram for hardware architecture designed for multiplication coefficient 4/5 with 12-bit precision.

The coefficients of this integer lifting-based architecture are as followed, a=−3/2, b=−1/16, c=4/5, d=15/32, and K=4 $\sqrt{2/5}$, wherein multipliers a, b, d can be realized by small number of shifters and adders but c needs to be realized in floating-point operations. If 12-bit precision floating-point operations are considered, the architecture shown in FIG. 8 is sufficient and totally needs 14 adders and 4 shifters. Thus, using the lifting-based architecture for this integer filter set totally needs 14 adders and few shifters while the critical path is 14 Ta.

Figure 9:
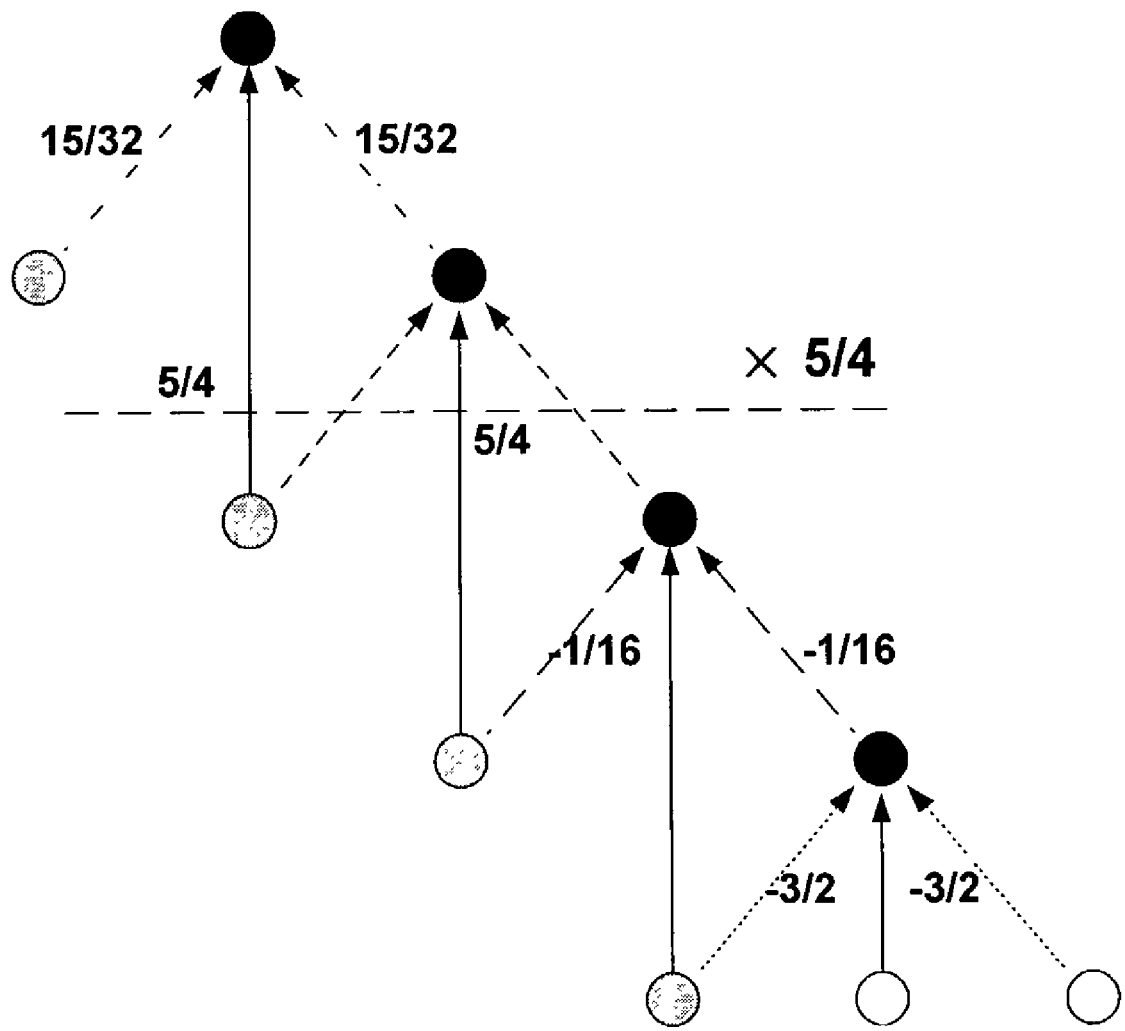
FIG. 9 is a signal flow chart for having one of basic computing units in the integer (9,7) filter flipped.

Now applying the present invention to flip the basic computing unit that includes c shown in FIG. 9, only 13 adders are needed. After relocating those adders, the critical path can be lowered to 7Ta. Besides, there are no floating-point operations involved in FIG. 9 so that the precision requirement of registers can be lowered.

The present invention uses Lifting-based architectures as starting point and corrects the flaw of longer critical path of Lifting-based architectures by applying flipping method so as to keep the merits of Lifting-based architectures in hardware requirement and to shorten the critical path as well. Thus, the hardware realization can be optimized. By applying Line-based Method to realize two-dimensional DWT, the required memory is positively proportional to the registers of the adopted one-dimensional DWT architectures. The flipping method can keep the least memory size under given hardware specifications and application restrictions and keep the least hardware requirements as well as the best critical path. From the above 2 illustrated examples, JPEC2000 (9,7) filter set and corresponding integer coefficient (9,7) filter, it shows the present invention far superior than some known technologies for realizing the hardware.

Applying the present invention can lower the hardware cost of DWT, ease the boundary extension controls and the complexity of memory accessing, and shorten the critical path therefore the present invention can effectively solve the flaw of the known technologies.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for hardware realization of a lifting-based Discrete Wavelet Transform (DWT), the method comprising the steps of:

forming a lifting-based DWT backbone as a plurality of serially-connected basic computing units, each of said basic computing units including an input node, a computation node and a register node, said input node and said register node respectively connected to said computation node through a corresponding multiplier, where an output of said computation node in a each of said basic computing units is connected to said input node of a next one of said basic computing units via a first feed-forward connection and where said register node of each of said basic computing units is connected to said computation node of said next one of said basic computing units via a second feed-forward connection;

replacing each multiplier in each of said basic computing units by a corresponding multiplier equivalent in value to an original value of said multiplier times a reciprocal value of said multiplier on said first feed-forward connection;

providing a multiplier on said second feed-forward connection, said multiplier equivalent in value to a product of respective reciprocal values of said multiplier on corresponding first feed-forward connections of each of said basic computing units connected by said second feed-forward connection; and replacing said computation node in each of said basic computing units by a corresponding pair of adders, where a first adder of said pair of adders adds respective register values of corresponding register nodes of each of said basic computing units connected by said second feed-forward connection, and where a second adder of said pair of adders adds an output value of said first adder with a value provided by said first feed-forward connection, where said output of said second adder is connected to an input of said second adder of said next one of said basic computing units by said first feed-forward connection.

2. The method as recited in claim 1 further including the steps of:

inserting a respective register node in each of said first feed-forward connection and each said second feed-forward connection; and storing respectively said output of said second adder and said register value of said register node in said register nodes inserted in said first feed-forward connection and said second feed-forward connection.

3. The method as recited in claim 1 further including the steps of:
   providing a first normalizer to said lifting-based DWT backbone; and
   multiplying a normalizing value corresponding to said normalizer by a corresponding set of said reciprocal values.

4. A hardware realization of lifting-based DWT comprising:
   a plurality of serially-connected basic computing units, each of said basic computing units connected by a first feed-forward path and a second feed-forward path to a next one of said basic computing units, each of said basic computing units including:
   an input node for receiving a signal;
   a register for storing a transformed value corresponding to said signal, said second feed-forward path providing said transformed value to said next one of said basic computing units;
   a first multiplier for providing at an output thereof said transformed value in said register multiplied by a first predetermined value;
   a first adder receiving at an input thereof a signal provided on said second feed-forward path and receiving at another input thereof said output of said first multiplier; and
   a second adder receiving at an input thereof a signal provided by an output of said first adder and receiving at another input thereof a signal provided on said first-feed forward path; and
   a second multiplier in said second-feed forward path for multiplying said signal provided to said first adder by a second predetermined value, wherein said first predetermined value and said second predetermined value have at least one common factor.

5. The hardware realization as recited in claim 4, wherein each of said basic computing units includes a third multiplier in said first feed-forward path for multiplying said signal thereon by a third predetermined value, said third predetermined value not other than a value having a factor of two.

6. The hardware realization as recited in claim 5, wherein said value of said third multiplier is unity.

7. The hardware realization as recited in claim 5, wherein said third multiplier is a shift register.

* * * * *